United States Patent
Yamada et al.

(10) Patent No.: US 9,662,981 B2
(45) Date of Patent: May 30, 2017

(54) INSTRUMENT FOR VEHICLE (71) Applicant: YAZAKI CORPORATION, Tokyo (JP)

(72) Inventors: Osamu Yamada, Shizuoka (JP); Kousuke Numano, Shizuoka (JP); Kunihiko Hosoo, Shizuoka (JP); Hiroshi Narushima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/044,395

(22) Filed: Feb. 16, 2016

(65) Prior Publication Data
US 2016/0159219 A1 Jun. 9, 2016

Related U.S. Application Data
(63) Continuation of application No. PCT/JP2014/073941, filed on Sep. 10, 2014.

(30) Foreign Application Priority Data
Sep. 10, 2013 (JP) ................. 2013-187539

(51) Int. Cl.
| | | |
|---|---|---|
| *G02F 1/1335* | (2006.01) | |
| *B60K 35/00* | (2006.01) | |
| *G01D 7/04* | (2006.01) | |
| *G01D 13/20* | (2006.01) | |
| *G02F 1/1362* | (2006.01) | |

(52) U.S. Cl.
CPC .............. *B60K 35/00* (2013.01); *G01D 7/04* (2013.01); *G01D 13/20* (2013.01); *B60K 2350/1072* (2013.01); *G02F 1/136204* (2013.01)

(58) Field of Classification Search
None
See application file for complete search history.

(56) References Cited

U.S. PATENT DOCUMENTS
2012/0306230 A1   12/2012   Huynh et al.

FOREIGN PATENT DOCUMENTS
| JP | 3-94222 A | 4/1991 |
|---|---|---|
| JP | 2009-216700 A | 9/2009 |
| JP | 2010-127800 A | 6/2010 |
| JP | 2012-63305 A | 3/2012 |
| JP | 2013-511423 A | 4/2013 |

OTHER PUBLICATIONS

International Search Report and Written Opinion of the International Search Report for PCT/JP2014/073941 dated Dec. 16, 2014.
English language Written Opinion of the International Search Report for PCT/JP2014/073941 dated Dec. 16, 2014.

*Primary Examiner* — Richard Kim
(74) *Attorney, Agent, or Firm* — Kenealy Vaidya LLP

(57) ABSTRACT

A dial, an LED, a black print film and a liquid crystal display panel are provided. A non-black print region where the black print film is absent is provided in, of a back surface of the dial, a circumferential part surrounding an opening and including an inner edge defining the opening.

3 Claims, 6 Drawing Sheets

INSTRUMENT FOR VEHICLE

CROSS REFERENCE TO RELATED APPLICATIONS

This application is a continuation of PCT application No. PCT/JP2014/073941, which was filed on Sep. 10, 2014 based on Japanese patent application No. 2013-187539 filed on Sep. 10, 2013, whose contents are incorporated herein by reference. Also, all the references cited herein are incorporated as a whole.

BACKGROUND OF THE INVENTION

1. Technical Field

The present invention relates to an instrument for a vehicle, such as a combination meter to be mounted on a vehicle.

2. Background Art

There is known an instrument for a vehicle in a form in which a translucent display design formed in a dial is illuminated with illumination light from behind the dial. In such an instrument for a vehicle, a display design is formed by white blanking or transparent color printing on the surface of a body of a dial formed out of transparent resin or the like, while light is shielded in the other parts by black printing. In addition, black printing is often performed on the back surface of the dial in order to prevent light from leaking out from an opening, a pointer shaft hole or the like formed in the dial or to prevent light from leaking out from between meters or display portions. In addition, white printing is generally performed on the other parts than the regions subjected to the black printing, in order to use reflection of light effectively as illumination light.

In addition, in most of recent instruments for vehicles, a liquid crystal display panel is disposed on a dial. The liquid crystal display panel is disposed on the back surface of the dial so that a display surface of the liquid crystal display panel can be visually recognized through an opening formed in the dial.

Black ink used for the black printing on the dial contains carbon black with conductivity. In addition, the black ink also contains an insulating material in addition to the carbon black. In this configuration, a part subjected to the black printing does not have conductivity as high as a metal material but has conductivity high enough to allow charges of static electricity to migrate. Accordingly, the part is characterized that charges caused by static electricity are apt to be accumulated because the charges do not migrate as quickly as that in metal.

On the other hand, the liquid crystal display panel may produce an inappropriate display due to influence of static electricity. For example, when a driver or the like touches a glass surface of the instrument for a vehicle, static electricity accumulated on the human body may flow into the liquid crystal display panel to affect display on the liquid crystal display panel.

In order to suppress static electricity from flowing into a liquid crystal display panel, Patent Literature JP-A-2009-216700 suggests that a semiconductor film is pasted onto the surface of a facing plate, and the semiconductor film is grounded. In addition, Patent Literature JP-A-2012-63305 describes an example in which static electricity flowing into a liquid crystal display panel from a glass surface is emitted to a circuit board through a flexible conductor.

SUMMARY

However, Both Patent Literature JP-A-2009-216700 and Patent
Literature JP-A-2012-63305 are aimed at suppression of static electricity flowing into a liquid crystal display panel from the front surface side of a dial without any consideration about static electricity flowing in from the back surface side of the dial. Therefore, charges may be accumulated in, of the back surface of the dial, a black print film applied to the circumference of an opening into which the liquid crystal display panel has been fitted. In this case, there is a fear that static electricity may flow into the liquid crystal display panel from the circumference of the opening so as to affect display on the liquid crystal display panel.

The present invention has been developed in consideration of the aforementioned circumstances. An object of the invention is to provide an instrument for a vehicle, capable of preventing or suppressing invasion of static electricity into a liquid crystal display panel so as to suppress occurrence of improper display on the liquid crystal display panel.

SOLUTION TO PROBLEM

In order to attain the aforementioned object, an instrument for a vehicle according to the invention is characterized in the following configurations (1) to (3).

(1) An instrument for a vehicle, including:

a dial including a translucent display design that is visually recognizable from the front of the instrument for a vehicle, and an opening;

a light-shading black print film that is formed on a back surface of the dial and contains carbon black; and a liquid crystal display panel that is disposed on the dial so that a display surface of the liquid crystal display panel is visually recognizable from the opening; wherein:

a non-black print region where the black print film is absent is provided in, of the back surface of the dial, a circumferential part surrounding the opening and including an inner edge defining the opening.

(2) The instrument for a vehicle according to the aforementioned configuration (1), wherein:

the non-black print region is provided in, of the back surface of the dial, a part where the dial touches another member.

(3) The instrument for a vehicle according to the aforementioned configuration (1) or (2), wherein:

a white print film is formed in the non-black print region.

According to the instrument for a vehicle having the aforementioned configuration (1), a non-black print region where the black print film containing carbon black is absent is provided in the circumferential part surrounding the opening of the dial and including the inner edge defining the opening. Accordingly, static electricity accumulated in the black print film formed on the back surface of the dial can be suppressed from flowing into the liquid crystal display panel. It is therefore possible to suppress occurrence of improper display on the liquid crystal display panel.

According to the instrument for a vehicle having the aforementioned configuration (2), the non-black print region is provided in a part where the dial touches another member such as a casing or a facing. The part is a region where charges may be generated largely. Thus, static electricity can be suppressed from flowing into the black print film formed on the back surface of the dial. As a result, migration of static electricity to the liquid crystal display panel can be suppressed as much as possible.

According to the instrument for a vehicle having the aforementioned configuration (3), due to the white print film formed in the non-black print region, it is easy to distinguish between a conductive region where the black print film has been formed and a non-conductive region where the white print film has been formed.

According to the invention, static electricity accumulated in a black print film formed on a back surface of a dial in order to secure a shading property can be suppressed from flowing into a liquid crystal display panel. It is therefore possible to suppress occurrence of improper display on the liquid crystal display panel.

The invention has been described briefly. Further, the details of the invention will be made clearer through the following mode for carrying out the invention (hereinafter referred to as "embodiment") with reference to the accompanying drawings.

DETAILED DESCRIPTION OF EMBODIMENTS

An embodiment of the invention will be described below with reference to the drawings.

Figure 1:
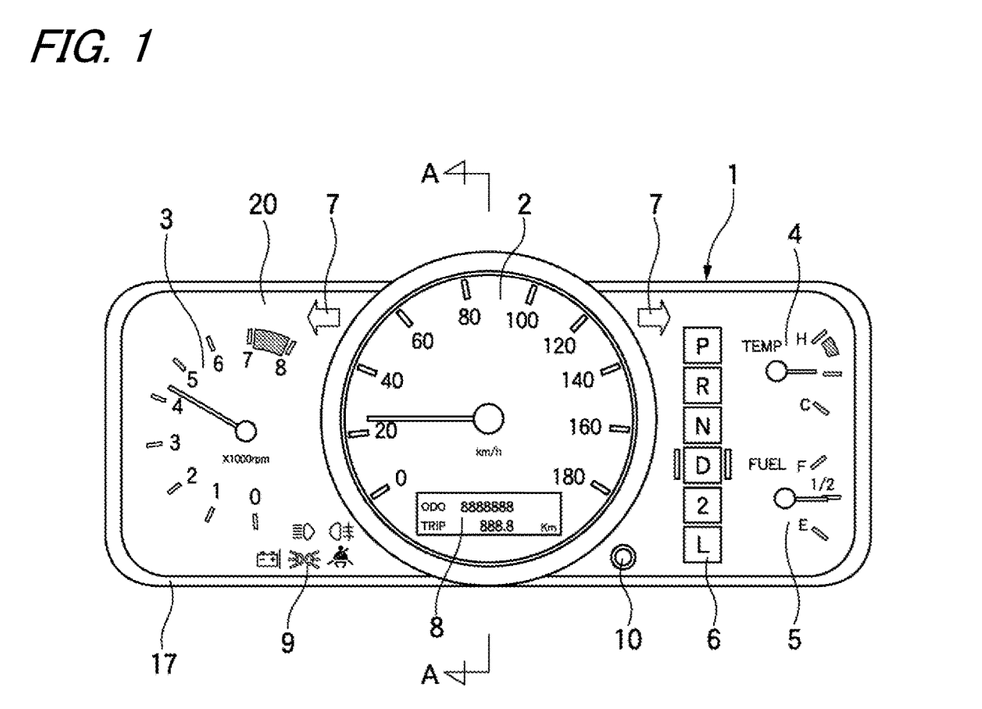
FIG. 1 is a front view of a combination meter that is an instrument for a vehicle according to an embodiment of the invention.
Figure 2:
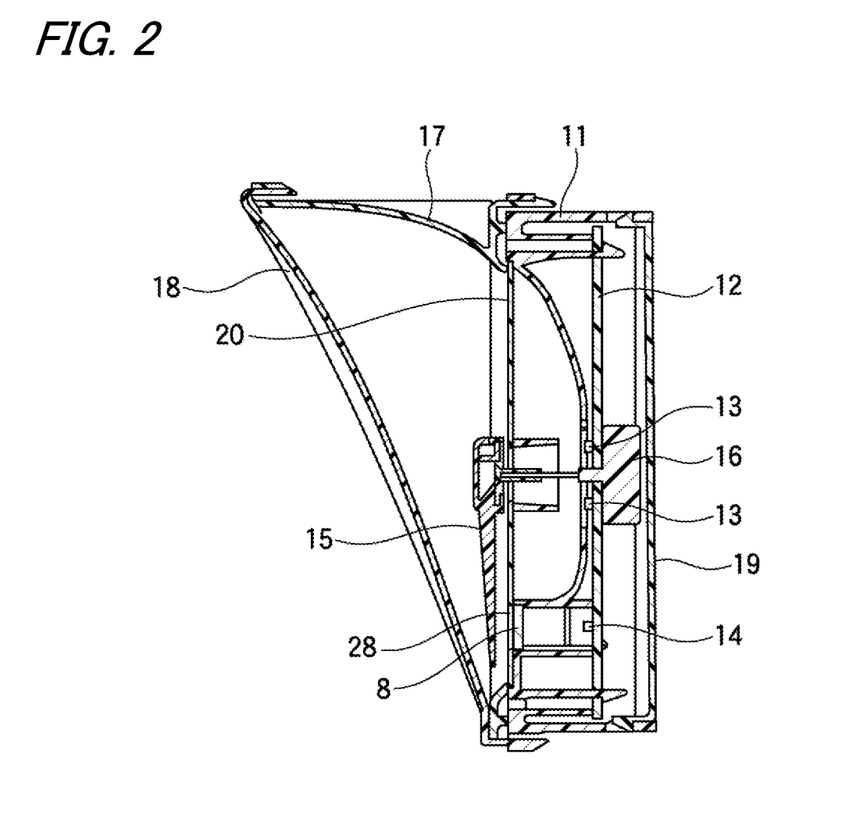
FIG. 2 is a sectional view taken from arrows A-A in FIG. 1.
Figure 3:
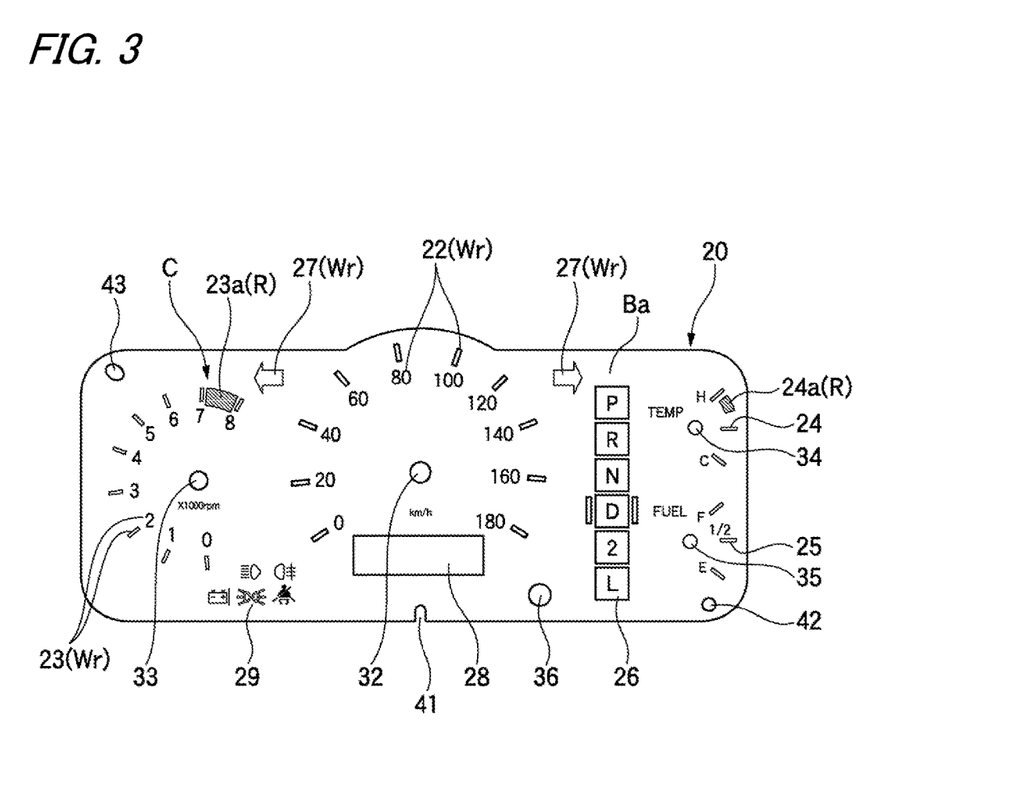
FIG. 3 is a front view of a dial in the combination meter according to the embodiment.
Figure 4:
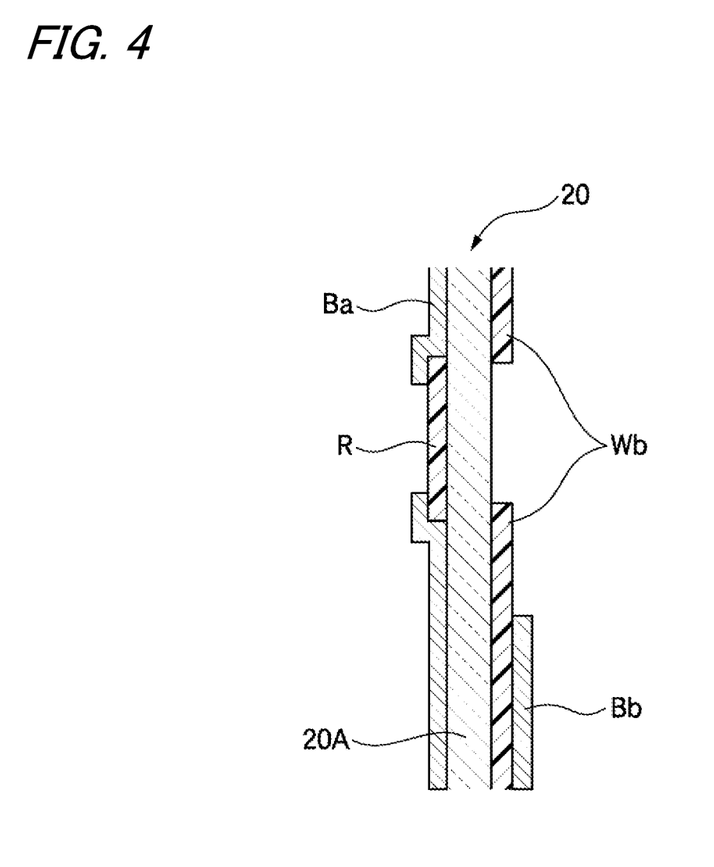
FIG. 4 is a sectional view of a red print portion (portion C in FIG. 3) of the dial in FIG. 3.

FIG. 1 is a front view of a combination meter that is an instrument for a vehicle according to the embodiment of the invention. FIG. 2 is a sectional view taken from arrows A-A in FIG. 1. FIG. 3 is a front view of a dial. FIG. 4 is a sectional view of a red print portion (portion C in FIG. 3) of the dial in FIG. 3.

As shown in FIG. 1, a combination meter 1 is disposed in a position where the combination meter 1 can be visually recognized from a driver seated on a driver's seat of a vehicle. The combination meter 1 includes a speed meter 2 indicating a traveling speed of the vehicle, a rotation meter 3 indicating an engine speed, a water temperature gauge 4 indicating a temperature of cooling water, a fuel gauge 5 indicating a remaining quantity of fuel, a shift indicator 6 indicating a shift range, a direction indicator 7, a liquid crystal display panel 8 serving as an odo/trip meter, various warning lights 9, etc. as various display units. The reference numeral 10 represents a shift knob 10 of the odo/trip meter.

As shown in FIG. 2, the combination meter 1 includes a casing 11 made of a resin formed product, a dial 20 disposed on the front surface side of the casing 11, a circuit board 12 disposed on the rear surface side of the casing 11, an LED (illuminating unit) 13 mounted on the circuit board 12 and illuminating the dial 20 from its back, an LED (light source) 14 mounted on the circuit board 12 as a backlight of the liquid crystal display panel 8, a pointer 15 disposed on the front surface of the dial 20, a movement 16 mounted on the back surface of the circuit board 12 in order to drive the pointer 15, a facing 17 disposed on the front surface of the dial 20, a front glass 18 disposed in front of the dial 20 and the facing 17, and a back cover 19 disposed at the rear of the circuit board 12.

In the dial 20, as shown in FIG. 3 and FIG. 4, a body 20A is formed of a translucent thin plate such as transparent polycarbonate resin or acrylic resin. The dial 20 has display designs 22, 23, 24, 25, 26, 27 and 29 such as characters and scales corresponding to the speed meter 2, the rotation meter 3, the water temperature gauge 4, the fuel gauge 5, the shift indicator 6, the direction indicator 7 and the various warning lights 9 respectively in its front surface (surface that can be visually recognized by the driver). In addition, the dial 20 is provided with pointer shaft holes 32, 33, 34 and 35, a knob hole 36, a positioning groove 41, positioning grooves 42 and 43, etc. corresponding to the speed meter 2, the rotation meter 3, the water temperature gauge 4 and the fuel gauge 5.

Further, a rectangular opening 28 is provided under the position of the dial 20 corresponding to the speed meter 2. The liquid crystal display panel 8 is disposed on the back surface side of the opening 28 so that the circumferential edge of the liquid crystal display panel 8 can be brought into tight contact with the inner edge defining the opening 28. Thus, the display surface of the liquid crystal display panel 8 can be visually recognized from the front of the instrument.

The translucent display designs 22, 23, 24, 25, 26, 27 and 29 are formed as transparent color print portions Wr. A black print film Ba that is a light-shading print is formed on the front-side surface of the body 20A of the dial 20 located at the circumferential edges of the display designs. In addition, as shown in FIG. 4, a translucent red print film R is formed in each of predetermined sites 23a and 24a of the display designs 23 and 24 and on the surface of the body 20A of the dial 20. A black print film Ba that is a light-shading print is formed on the surface of the body 20A of the dial 20 located at the circumferential edge of the red print film R. When illuminated by the LED 13 from the back surface of the dial 20, the display designs 22, 23, 24, 25, 26, 27 and 29 appear to emit light brightly. Incidentally, although a white print film Wb and a black print film Bb are formed on the back surface of the dial 20 in FIG. 4, the white print film Wb and the black print film Bb will be described later.

Figure 5A:
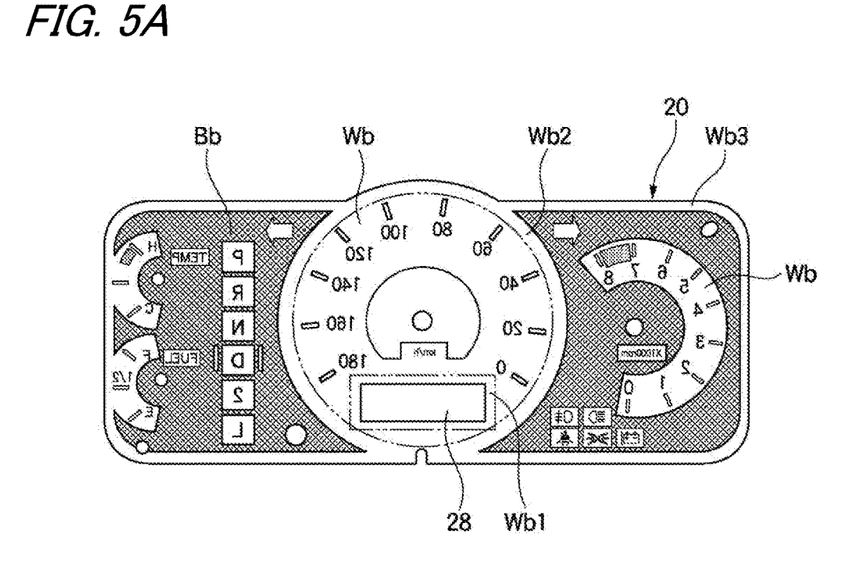
FIG. 5A and FIG. 5B are views in which the dial is observed from its back, FIG. 5A being a back view of the dial in the combination meter according to the embodiment of the invention, FIG. 5B being a back view of a dial shown as a comparative example.
Figure 5B:
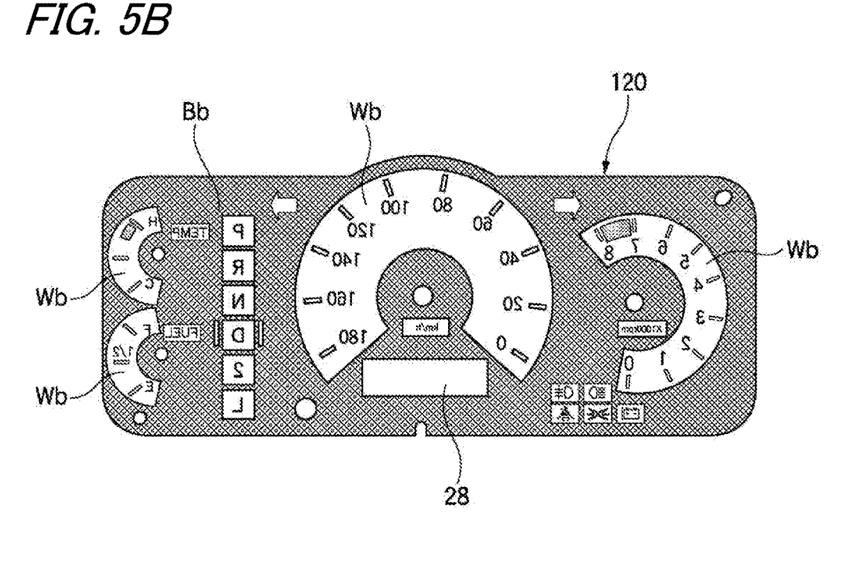

FIGS. 5 are views in which the dial 20 is observed from its back. FIG. 5A is a back view of the dial 20 in the combination meter according to the embodiment of the invention. FIG. 5B is a back view of a dial 120 shown as a comparative example.

As shown in FIG. 5A and FIG. 5B, the black print film Bb is formed on the back surface (reverse side) of each dial 20, 120 in order to prevent light from leaking. The white print film Wb for using reflection of light effectively as illumination light is formed in the other part than the region where the black print film Bb is formed. The white print film Wb is formed not to disturb the translucency of each display design 22, 23, 24, 25, 26, 27, 29. Specifically, as shown in FIG. 4, the white print film Wb is formed not to be located at places corresponding to the display designs 22, 23, 24, 25, 26, 27 and 29. On the other hand, carbon black having conductivity is contained together with an insulating material in black ink used for forming the black print film Bb.

Figure 6:
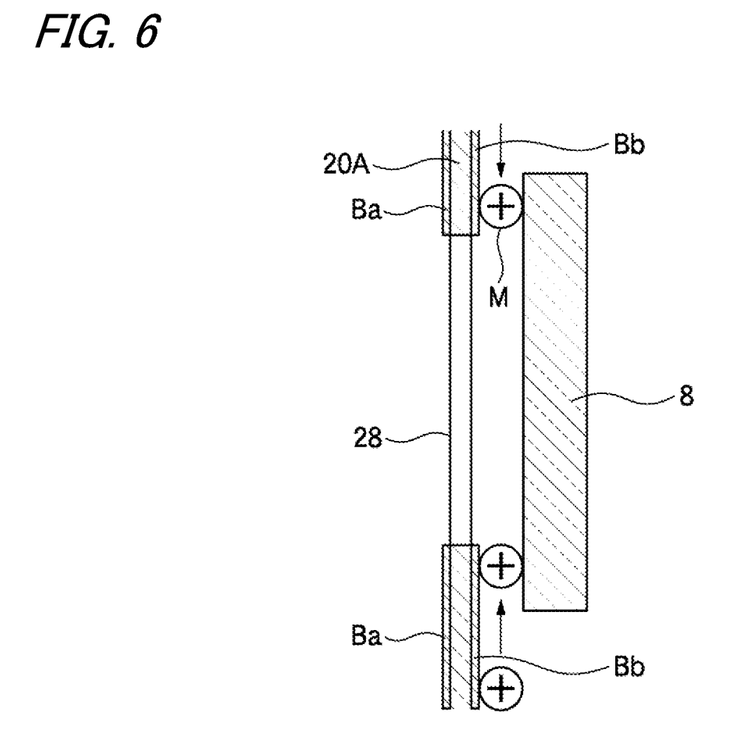
FIG. 6 is a sectional view for explaining problems in the comparative example of FIG. 5B.

As shown in FIG. 5B, in the dial 120 according to the comparative example, the black print film Bb is formed on the back surface of the dial 120 to reach the inner edge defining the opening 28 in order to prevent light from leaking from the opening 28 to which the liquid crystal display panel 8 is attached. When the black print film Bb is thus formed to reach the inner edge of the opening 28, the circumferential edge of the liquid crystal panel 8 and the black print film Bb touch each other when the circumferential edge of the liquid crystal display panel 8 is brought into tight contact with a circumferential part of the body 20A surrounding the opening 28, as shown in FIG. 6. Thus, charges M of static electricity can migrate to the liquid crystal display panel 8 through the black print film Bb. As a result, there is a fear that the charges M may affect display on the liquid crystal display panel 8.

In the dial 20 of the combination meter according to the embodiment of the invention, in contrast to the aforementioned comparative example, the black print film Bb is not formed in a circumferential part surrounding the opening 28 and including the inner edge defining the opening 28, but a non-black print region where the black print film is absent is formed. In the embodiment, a white print portion Wb1 is formed as the non-black print region in the circumferential part surrounding the opening 28. In addition, white print portions Wb2 and Wb3 are also formed in parts that touch another member than the liquid crystal display panel, such as the facing 17 or the casing 11.

In this manner, according to the embodiment, the non-black print region (white print portion Wb1) where the black print film Bb containing carbon black is absent is provided in, of the back surface of the dial 20, the part surrounding the opening 28 and including the inner edge defining the opening 28. Accordingly, static electricity accumulated in the black print film Bb formed on the back surface of the dial can be suppressed from flowing into the liquid crystal display panel 8. It is therefore possible to suppress occurrence of improper display on the liquid crystal display panel 8.

In addition, the non-black regions (white print portions Wb2 and Wb3) are formed in the parts where the dial 20 touches another member such as the facing 17 or the casing 11 and which are regions where charges may be generated largely. Accordingly, static electricity can be suppressed from flowing into the black print film Bb formed on the back surface of the dial 20. It is therefore possible to suppress migration of static electricity to the liquid crystal display panel 8 as much as possible. In addition, due to each white print film Wb (white print portions Wb1, Wb2 and Wb3) formed in each non-black print region, it is possible to easily distinguish between a conductive region where the black print film Bb has been formed and a non-conductive region where the white print film Wb has been formed.

Incidentally, due to the black print film Ba formed on the front surface side of the dial 20 (see FIG. 4), a required shading property (effect of preventing light from leaking) can be secured at each place where the black print film Bb is not formed on the back surface of the dial 20. In addition, as for the shift indicator 6 or the various warning lights 9, the white print film Wb is formed on the back surface side of the dial 20, but a required shading property (effect of preventing light from leaking) can be secured by the black print film Ba formed at a required place on the front surface side.

Further, the invention is not limited to the aforementioned embodiment, but suitable deformations, improvements and so on may be made thereon. In addition, materials, shapes, dimensions, numbers, arrangement places, etc. of constituent elements in the aforementioned embodiment are not limited but may be selected desirably if the invention can be attained.

For example, although the opening 28 formed in the dial 20 serves as an opening in the aforementioned embodiment, the opening 28 may be made of a transparent body 20A of the dial 20 as long as the display contents of the liquid crystal panel 8 can be observed from the front.

Here, the aforementioned features of the embodiment of the instrument for a vehicle according to the invention will be summarized and listed in the following paragraphs respectively.

[1] An instrument (combination meter 1) for a vehicle, including:
a dial (20) including translucent display designs (22, 23, 24, 25, 26, 27 and 29) that is visually recognizable from the front of the instrument for a vehicle, and an opening (28);
a light-shading black print film (Bb) that is formed on a back surface of the dial and contains carbon black; and
a liquid crystal display panel (8) that is disposed on the dial so that a display surface of the liquid crystal display panel is visually recognizable from the opening; wherein:
a non-black print region (white print portion Wb1) where the black print film is absent is provided in, of the back surface of the dial, a circumferential part surrounding the opening and including an inner edge defining the opening.

[2] The instrument for a vehicle according to the paragraph [1], wherein:
the non-black print region (white print portions Wb2 and Wb3) is provided in, of the back surface of the dial, a part where the dial touches another member.

[3] The instrument for a vehicle according to the paragraph [1], wherein:
a white print film is formed in the non-black print region.

Although the invention has been described in detail and with reference to its specific embodiment, it is obvious for those skilled in the art that various changes or modifications can be applied to the invention without departing from the spirit and scope thereof.

According to the invention, static electricity accumulated in a black print film formed on a back surface of a dial in order to secure a shading property can be suppressed from flowing into a liquid crystal display panel. Accordingly, it is possible to obtain an effect that it is possible to suppress occurrence of improper display on the liquid crystal display panel. The invention showing the effect is useful for an instrument for a vehicle such as a combination meter to be mounted on a vehicle.

What is claimed is:

1. An instrument for a vehicle, comprising:
a dial including a translucent display design that is visually recognizable from the front of the instrument for a vehicle, and an opening;
a light-shading black print film that is formed on a back surface of the dial and contains carbon black; and
a liquid crystal display panel that is disposed on the dial so that a display surface of the liquid crystal display panel is visually recognizable from the opening; wherein:

a non-black print region where the black print film is absent is provided in, of the back surface of the dial, a circumferential part surrounding the opening and including an inner edge defining the opening.

2. The instrument for a vehicle according to claim 1, wherein
the non-black print region is provided in, of the back surface of the dial, a part where the dial touches another member.

3. The instrument for a vehicle according to claim 1, wherein
a white print film is formed in the non-black print region.

\* \* \* \* \*